(12) United States Patent
Corkin et al.

(10) Patent No.: US 9,565,872 B2
(45) Date of Patent: Feb. 14, 2017

(54) COMBINATION JUICER BLENDER

(75) Inventors: Daniel Robert Corkin, Riverwood (AU); Stephen John McClean, Camden South (AU); Scott Brady, Malabar (AU); Richard Hoare, Lane Cove (AU); Vyvyan Rose, Vaucluse (AU); Tristan Brega, Kyabram (AU); Gerard Andrew White, Darlington (AU); Khon Thai, Beverly Hills (AU); Jarred Twigg, Randwick (AU); Simon James Chalk, Redfern (AU)

(73) Assignee: Breville Pty Ltd, Alexandria, NSW (AU)

( * ) Notice: Subject to any disclaimer, the term of this patent is extended or adjusted under 35 U.S.C. 154(b) by 171 days.

(21) Appl. No.: 14/237,886

(22) PCT Filed: Aug. 10, 2012

(86) PCT No.: PCT/AU2012/000945
§ 371 (c)(1),
(2), (4) Date: Feb. 16, 2014

(87) PCT Pub. No.: WO2013/020179
PCT Pub. Date: Feb. 14, 2013

(65) Prior Publication Data
US 2014/0190359 A1   Jul. 10, 2014

(30) Foreign Application Priority Data

Aug. 11, 2011 (AU) .................... 2011903212

(51) Int. Cl.
*A47J 19/02* (2006.01)
*A23N 1/00* (2006.01)
*A23N 1/02* (2006.01)
*A47J 43/04* (2006.01)

(52) U.S. Cl.
CPC ................. *A23N 1/02* (2013.01); *A23N 1/003* (2013.01); *A47J 19/027* (2013.01); *A47J 43/04* (2013.01)

(58) Field of Classification Search
CPC .......... A47J 19/027; A23N 1/003; A23N 1/02; A23N 1/00
USPC .... 99/513, 512, 511, 510; 210/360.1, 380.1; 241/37.5, 92, 282.1, 282.2
See application file for complete search history.

(56) References Cited

U.S. PATENT DOCUMENTS

| 2,513,519 | A | * | 7/1950 | Reynolds | A47J 19/027 99/511 |
| 5,031,522 | A | * | 7/1991 | Brixel | A23L 2/04 210/360.1 |
| 5,784,954 | A | * | 7/1998 | Kokot | A47J 19/027 241/37.5 |
| 7,066,082 | B2 | * | 6/2006 | O'Loughlin | A47J 19/027 99/511 |
| 8,210,101 | B2 | * | 7/2012 | Wu Chang | A47J 43/0788 99/337 |
| 2014/0147565 | A1 | * | 5/2014 | Schallig | A47J 19/027 426/489 |

* cited by examiner

*Primary Examiner* — Reginald L Alexander
(74) *Attorney, Agent, or Firm* — Michael Molins

(57) ABSTRACT

A juicer and a blender share a common base. The juicer and blender may share a common motor. The juicer has a spout that discharges into the blender.

15 Claims, 11 Drawing Sheets

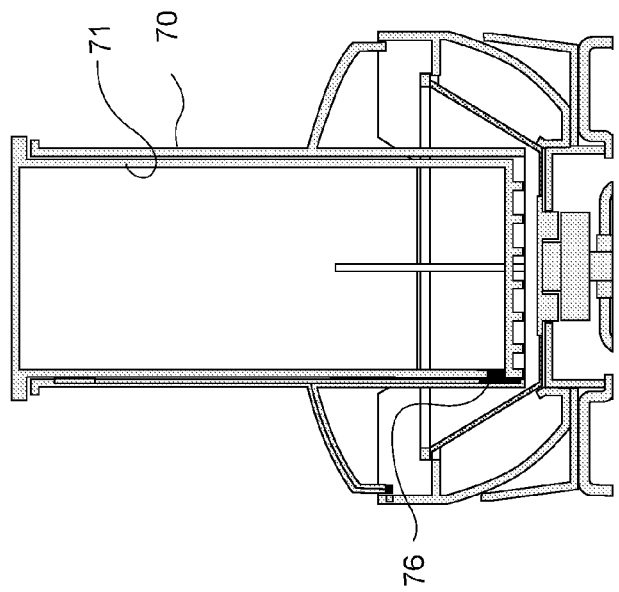
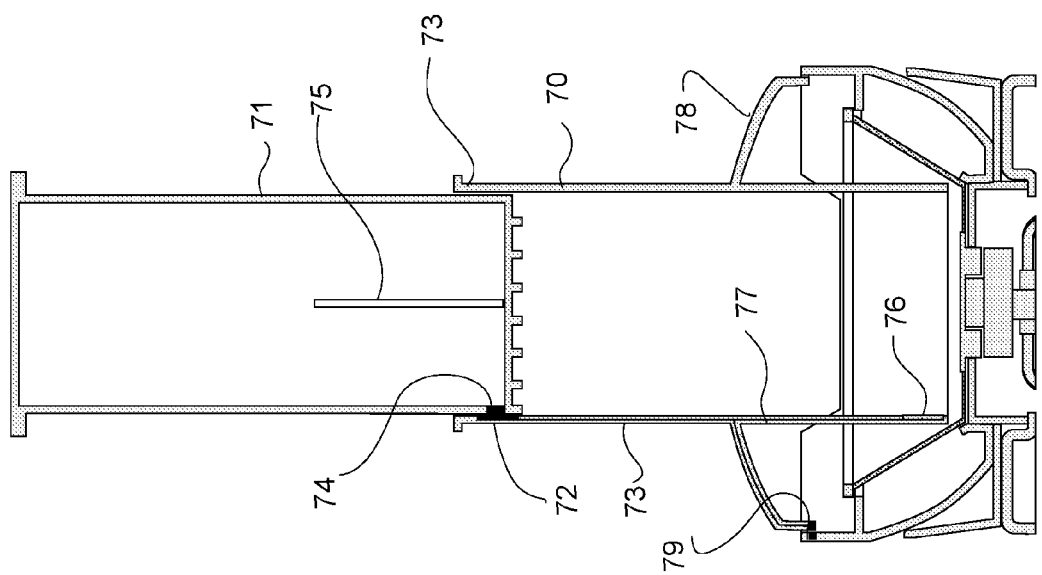
FIG. 4

FIG. 6
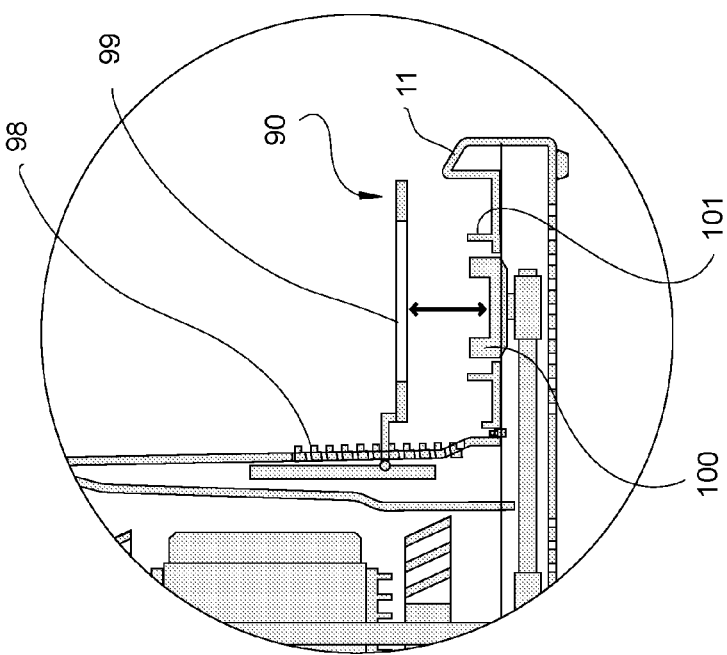
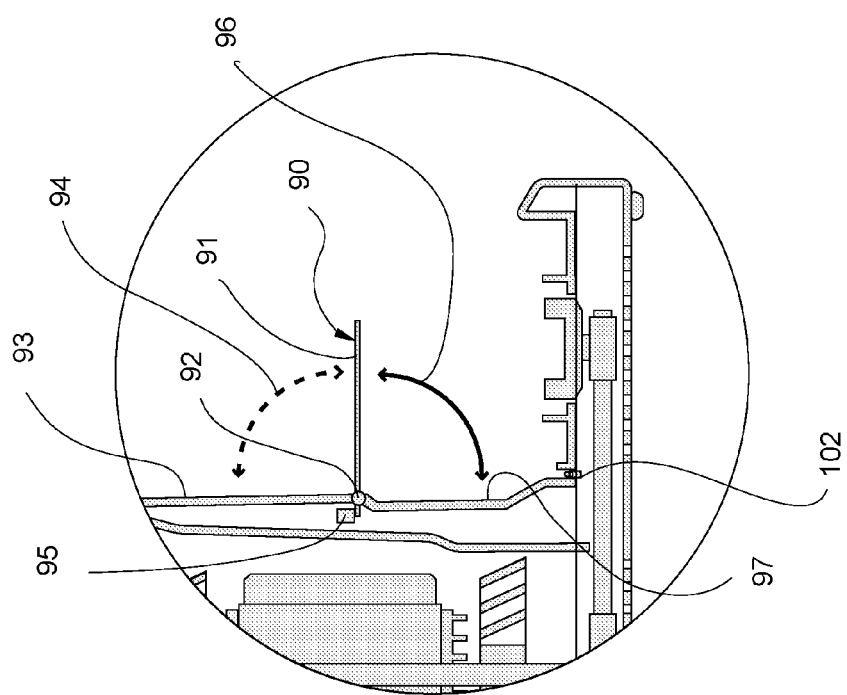

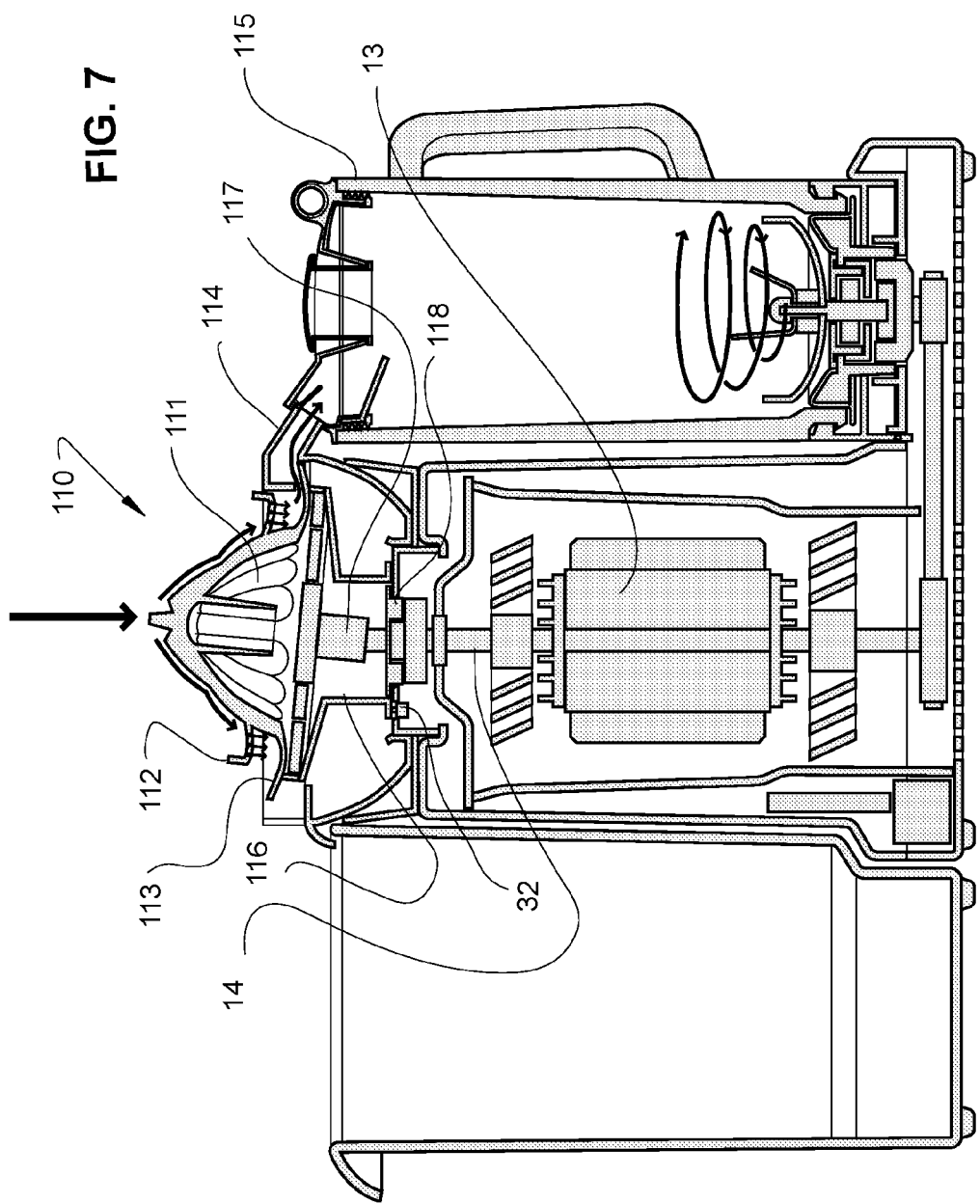

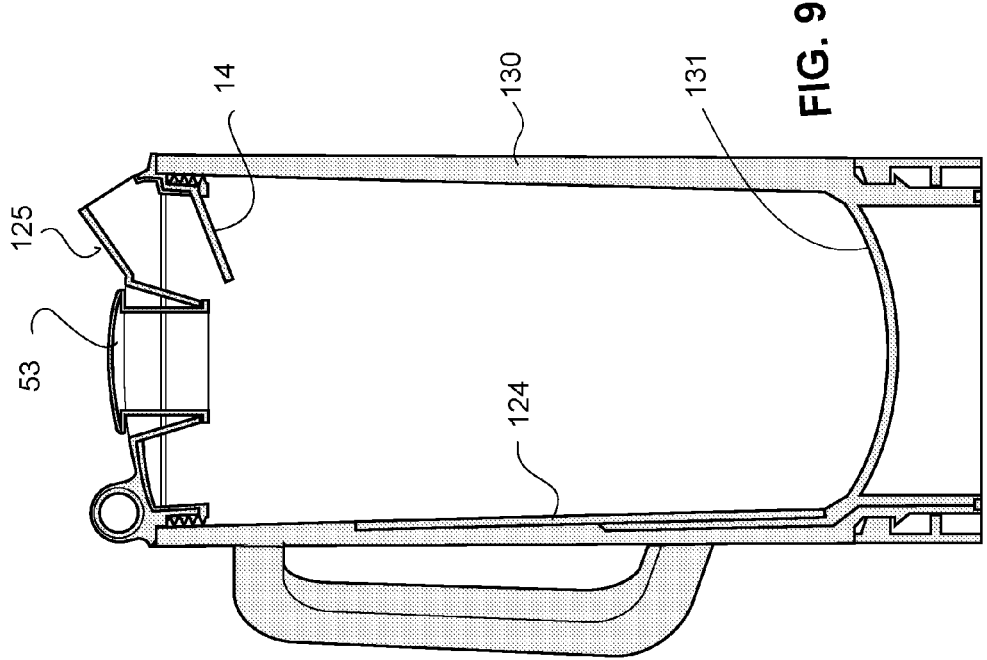
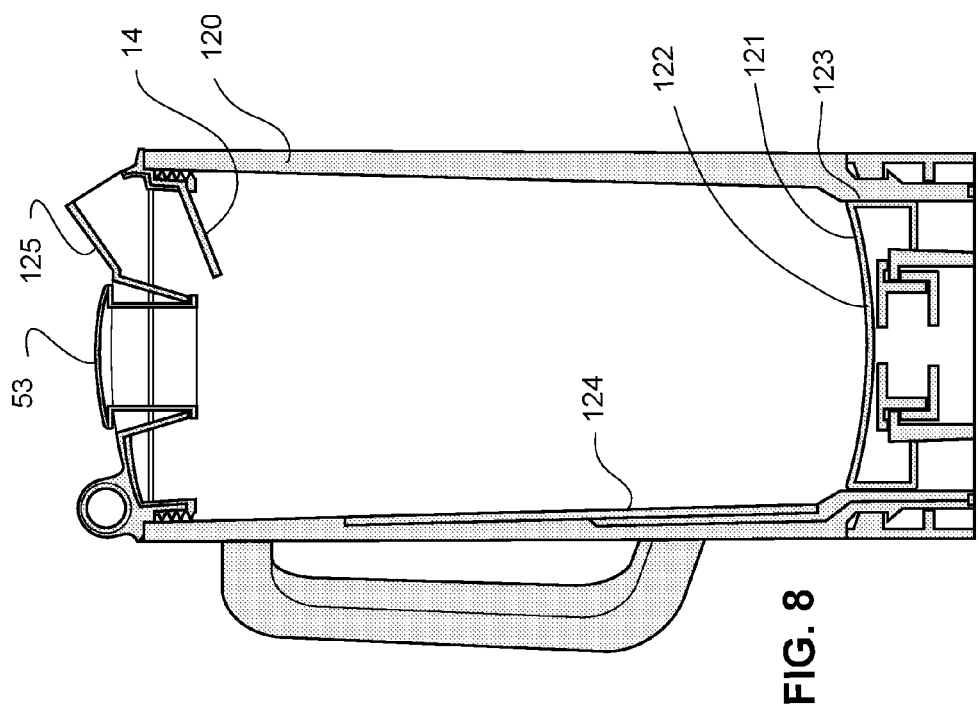

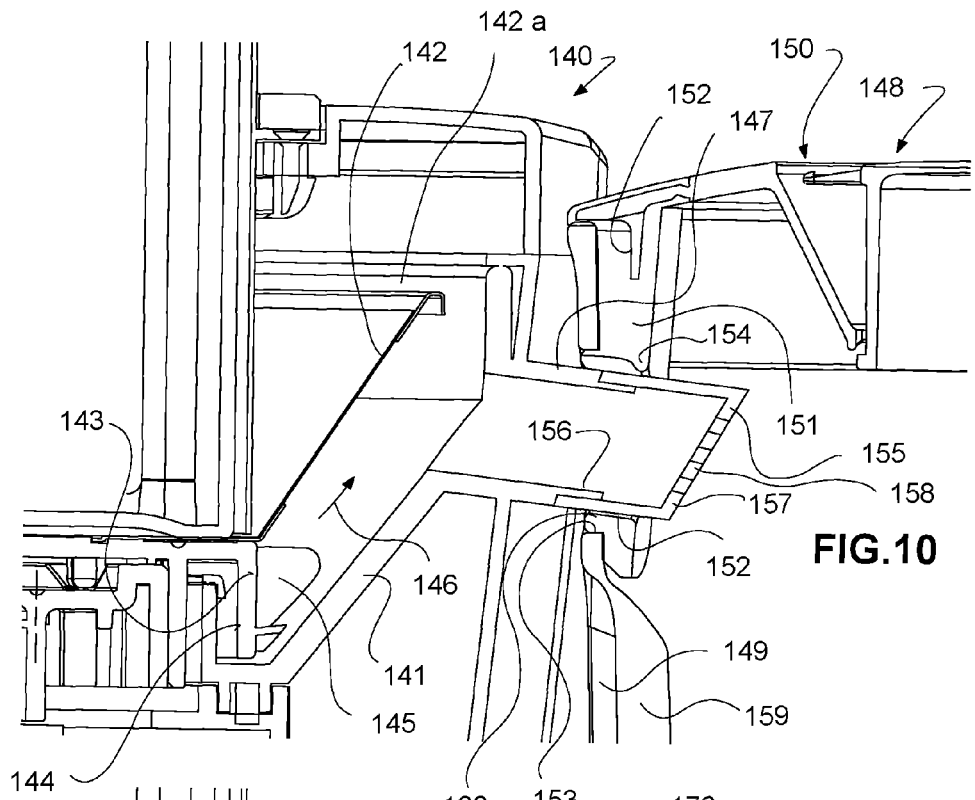
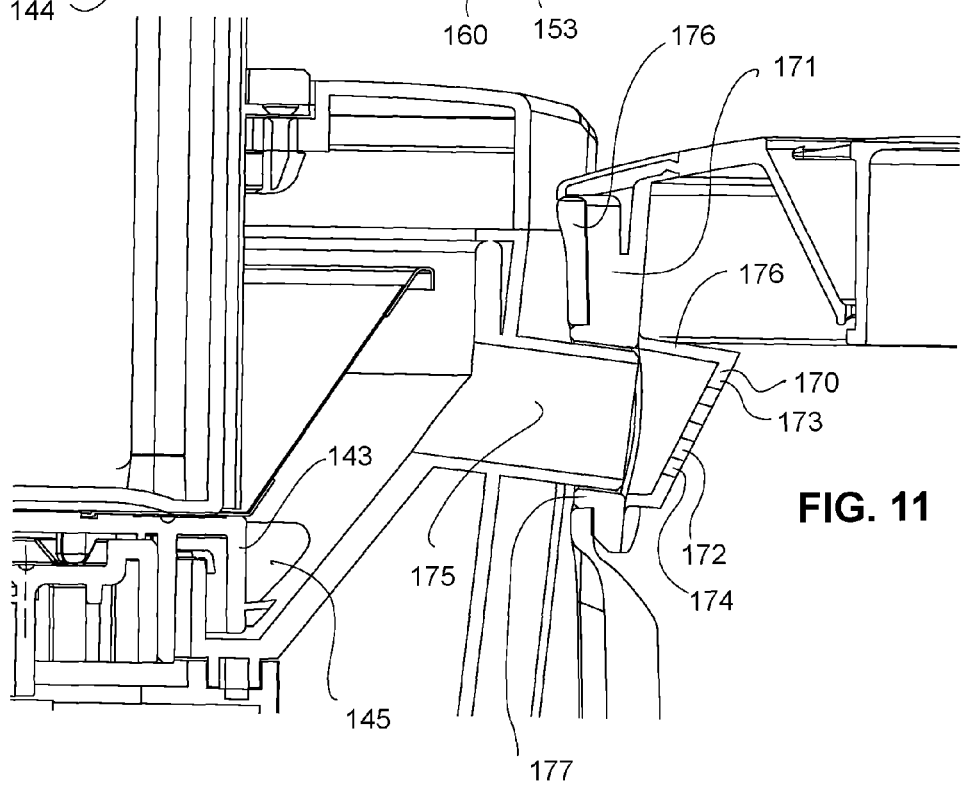

COMBINATION JUICER BLENDER

FIELD OF THE INVENTION

The invention relates to fruit and vegetable juicers and more particularly to the combination, in one appliance, of a fruit and vegetable juicer with a beverage blender.

BACKGROUND OF THE INVENTION

Motorised fruit and vegetable juicers and motorised beverage blenders are well known. The design of domestic juicers is somewhat limited by the requirement that the height of the juicer not interfere with standard kitchen cabinets. Also a smaller countertop foot print is always seen as an advantage with respect to a larger footprint. With this in mind, it can be better appreciated that the continuous operation of a juicer is limited by the capacity of the jug or container into which it dispenses. Once the juice, jug or container is full, it must be emptied before further juicing can be performed. This is sometimes viewed as an inconvenience and a source of unnecessary spillage.

In order to increase the capacity of the juice collecting jug or container without materially increasing the foot print or overall height of the device as a whole, it is considered desirable to raise the juicer's discharge spout so that a larger jug or container can be accommodated under it.

It comes to pass that the raising of the outlet also provides the opportunity of locating generally full size blender below the juicer's spout.

OBJECTS AND SUMMARY OF THE INVENTION

It is an object of the technology to provide a combined motorised fruit and vegetable juicer.

It is also an object of the technology to provide a combination fruit and vegetable juicer with a beverage blender with a jug, utilising a single electric motor.

Accordingly, there is provided, on a single base, a combination fruit and vegetable juicer and beverage blender. A single electric motor powers both the juicer and the blender.

There is also provided a fruit and vegetable juicer having a grating disc surrounded by a frusto-conical filter basket. The juicer has a discharge spout that is located, so as to discharge into the jug.

In another embodiment, there is provided a combination juicing and blending device having a base supporting a juicer and a first coupling component for receiving a blending jug with internal blades, the jug having a second coupling component for cooperating with the first coupling component. The juicer has a spout that dispenses into the blending jug when the first and second coupling components are engaged.

In some embodiments, the jug of the blender has a side wall in which is formed a first opening for receiving the juicer's spout.

In other embodiments of the technology, the jug as a lid and the lid has an opening for receiving the juicer's spout.

In some preferred embodiments, the jug has a level detection mechanism that provides liquid level information that is used to control the operation of the juicer.

In particular embodiments of the technology, the juicer has a feed tube and a pusher that cooperate to provide a signal to a controller in the device so that the juicer will not operate unless the pusher has been inserted into the feed tube.

In other embodiments, the juicer has a feed tube below which is a grating disc. The feed tube has a gate that pivots to allow food in the feed tube to make contact with the grating disc.

In selected embodiments, the juicer has an adjustable height platform beneath the spout.

In alternate embodiments, the device is provided with a citrus juicing accessory with a reamer that replaces the grating disc and filter that would otherwise be carried by the juicer.

Some embodiments encompass a replacement jug that is received by the base. The replacement jug lacks blades.

In other selected embodiments, the jug has a lid with a backing panel in which is formed a second opening that cooperates with the first opening in the side wall of the blender's jug.

In particularly preferred embodiments, the juicer further comprises a grating disc with a coupling portion. A coupling portion has an array of vanes for generating an airflow.

BRIEF DESCRIPTION OF THE DRAWING FIGURES

In order that the invention be better understood, reference is now made to the following drawing figures in which:

FIG. 4 illustrates, in cross section, the initial and final positions of a pusher in respect of a feed tube of a juicer;

FIG. 6 shows two embodiments, in cross section, of an external single serve platform for a juicer;

FIG. 7 is a cross sectional view of a combination juicer and blender, to which is fit a citrus press accessory; and FIG. 8 is a cross sectional view of a jug with a removable continuous floor assembly;

FIG. 9 is a cross section of a jug with an integral and continuous floor;

FIG. 10 is a cross section through a spout of a juicer that enters a side wall of a jug;

FIG. 11 is a cross section through a spout of a juicer that enters a side wall of a jug;

BEST MODE AND OTHER EMBODIMENTS

Figure 1:
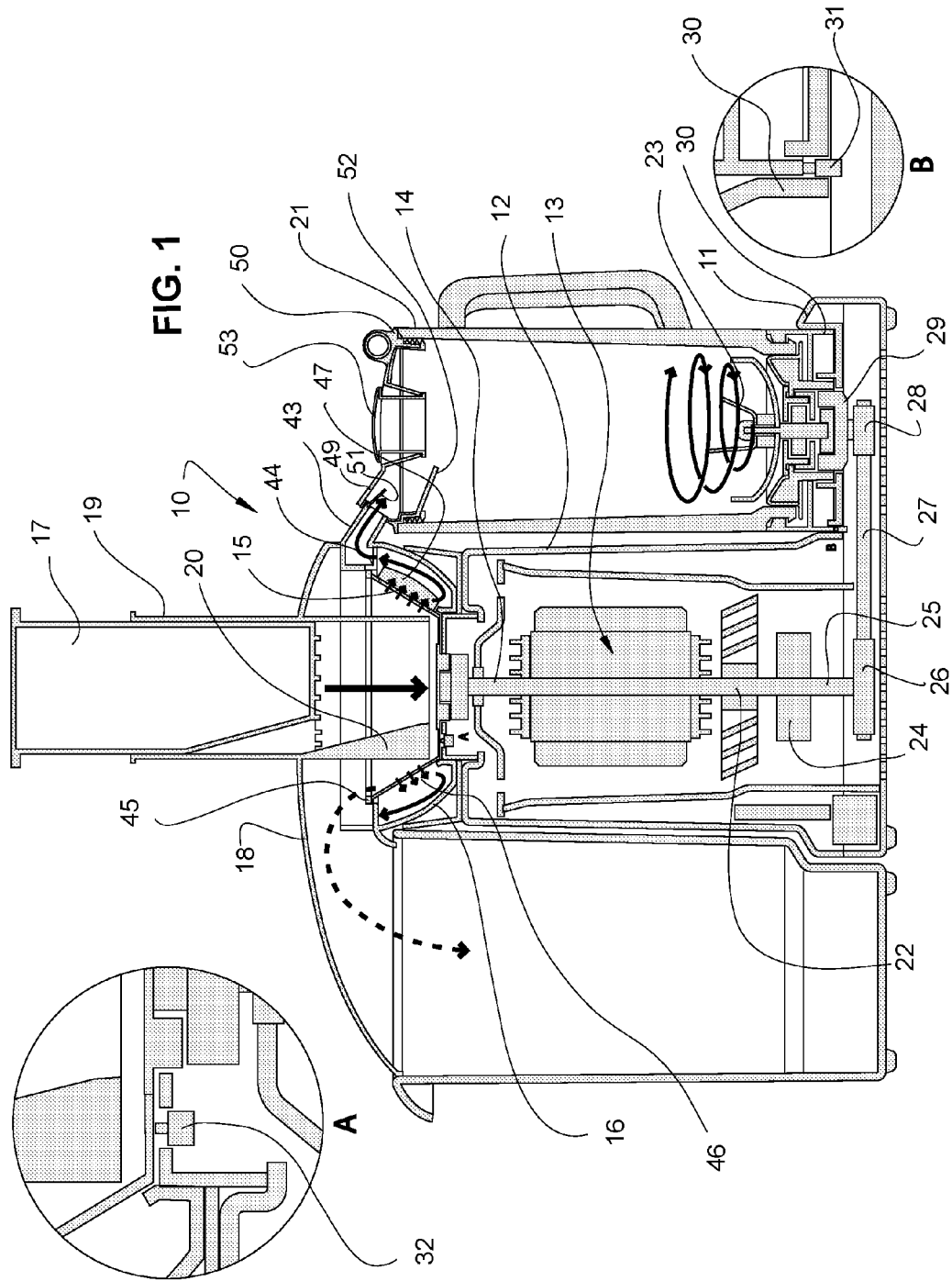
FIG. 1 is a cross sectional view of a combination juicer and blender in accordance with the teachings of the present invention.

As shown in FIG. 1, a combination fruit and vegetable juicer and blender 10 comprises a single chassis having a base 11. One portion of the chassis comprises a housing 12 that contains a single electric motor 13. In preferred embodiments, the motor has an upper and a lower output shaft.

In preferred embodiments, the blender and juicer may be operated independently. To this effect, a switch reluctance motor may be used to deliver different schemes of rotating power distribution in both forward and backward rotational directions. It will also be appreciated that the juicer and the blender may be operated concurrently.

The upper output shaft 14 is used to rotate the grating disc and frusto-conical filter basket 15 that is associated with a fruit and vegetable juicing accessory set. The set further comprises a removable juice collecting chamber 16, a pusher 17 and a lid 18 having a feed tube 19. Because the feed tube is located directly over and concentric with the grating disc, an internal anti-rotation knife 20 is provided within the feed tube 19.

Because the base 11 also supports a removable blending jug 21 and because the blending jug 21 must be operated independently of the juicer, rotating power from the motor's lower output shaft 22 must be able to be decoupled from the rotating blades 23 of the juicing jug 21. This can be done by having the lower output shaft of the motor operate independently from the upper shaft or by providing any one of a number of clutch or transmissions mechanisms 24 in the power train that connects the lower shaft 22 with the rotating blades 23. This transmission mechanism 24 may be a clutch mechanism, a dog gear mechanism, a solenoid or mechanically activated gear mechanism, belt drive or the like. In this embodiment, the output shaft 25 of the transmission mechanism 24 rotates a pulley sheave that is connected by a power transmission belt 27 to a driven sheave 28. The driven sheave 28 is attached to a coupling 29 that is permanently mounted with the base 11. The coupling 29 powers the rotation of the blades 23.

In the example of FIG. 1, a lower rim 30 of the jug 21 is adapted to contact a micro switch or a mechanical link to a safety or micro switch 31 that is located in the base 11. With this safety switch 31 in contact with the jug 21 when it is properly seated, the motor 13 is able to deliver power to the coupling 29. However, if the jug is not properly seated against the safety switch 31, the coupling will not rotate, either because the power to the motor is denied or because the transmission mechanism 24 is deactivated.

A second micro switch 32 is located at the top of the housing 12. When downward pressure is applied to this switch 32 by the action of fruits or vegetables being urged toward the grating disc in the basket 15, power is delivered to the motor 13. Thus, the motor 3 cannot start and the grating disc cannot rotate unless a user applies pressure to the pusher 17 while fruits or vegetables are contained below the pusher and inside the feed tube 19.

Figure 2:
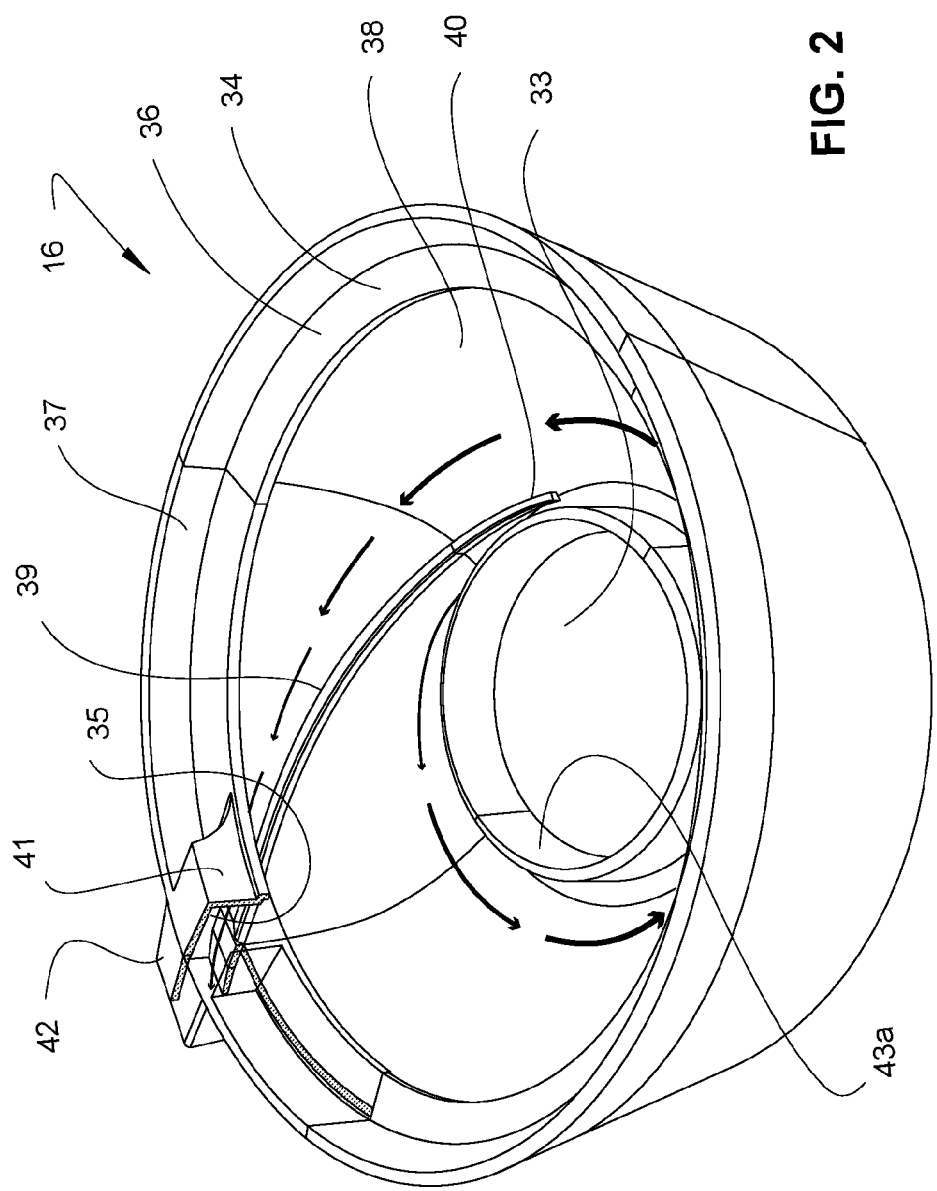
FIG. 2 is a perspective view, partially cut away, depicting a juice collection chamber.

The removable juice collection chamber 16 is depicted in FIGS. 1 and 2. In preferred embodiments, the collection chamber 16 is fabricated from stainless steel. The chamber is bowl shaped having a central opening 33 that admits the coupling of the electric motor 13 to the filter basket 15. The collection chamber 16 also has an upper and inwardly directed rim 34 that prevents juice from escaping except through an exit opening 35 forming an interruption to both the inwardly directed portion of the rim 36 and any upright portion of the rim 37.

As shown in the example of FIG. 2, the smooth and rising interior wall 38 of the collection chamber 16 incorporates an inwardly directed rib guide or diverter 39. The rib 39 extends from the bottom of the collection chamber 40 to the exit opening 35. In this example, the exit opening is partially covered by a shroud 41 or shield that blocks pulp and collects the juice and directs it toward the entry opening 42 of the discharge spout 43. The discharge spout 43 and its entry 42 may be integral with the lid 18. As will be explained, the rib 39 is wound or curves in the direction of rotation of the filter basket 15 as it extends from the bottom of the chamber 40 to the exit 35. The central opening 33 is surrounded by an upright rim 43a.

In order to increase the height of the spout 43 from the base 11, at least a portion 44 of the spout 43 is located adjacent to or above the upper most rim 45 of the rotating filter basket. As shown by the arrows 46 juice flows through the filter basket into the collection chamber 16. Gravity would tend to accumulate the juice at the bottom of the collection chamber 16. However, the rapid rotation of the filter basket 16 creates rapidly rotating currents of air n the area between the outside of the filter basket and the interior of the collection chamber. Juice is also propelled in the direction of rotation as it exits the basket 15. These rotating currents act on the moving juice in the collection chamber, causing the juice to swirl or rotate and ascend up the interior wall of the collection chamber toward the entry 44 of the spout 43. In order to further encourage this movement of juice against the force of gravity, the exterior of the filter basket may be provided with one or more fins 47. These fins 47 preferably extend, on the exterior of the filter basket, from the bottom of it toward the top or rim 45.

As shown in FIG. 1, the discharge spout 43 is adapted to cooperate with the inlet 49 formed in the lid 50 of the blender jug 21 that is located adjacent to the housing 12. In preferred embodiments, the terminal end of the spout 43 fits within the inlet or fill port 49. When the jug and its lid are removed from the base, juice clinging to the interior of the spout 43 may tend to drip from the spout's discharge opening. In order to prevent this, the discharge opening of the spout is provided with a hinged cover 51. The cover 51 is biased into a closed position with respect to the spout. Thus, when the jug is removed, the cover 51 will close and seal the discharge opening. However, owning to a small portion (51a, see FIG. 5) that protrudes from the cover 47, locating the inlet 49 over the discharge spout 43 causes the cover 47 to open against the influence of its own bias mechanism, spring or the like.

When the blades 23 of the blending jug are operated, the contents of the jug are propelled upward toward the lid 50. Because the fill port 49 is always open, this could cause inadvertent discharge of the contents of the jug. To prevent this, an internal shelf 52 is provided. The shelf blocks the movement of liquids toward the inlet 49.

In preferred embodiments, the lid 50 of the blender has a cap 50 that can be removed, particularly when the juicer is operating. Operation of the juicer causes relatively large volumes of juice, air and froth to be propelled into the jug 21. Removal of the cap 53 allows more air to escape and it inhibits excesses frothing.

Figure 3:
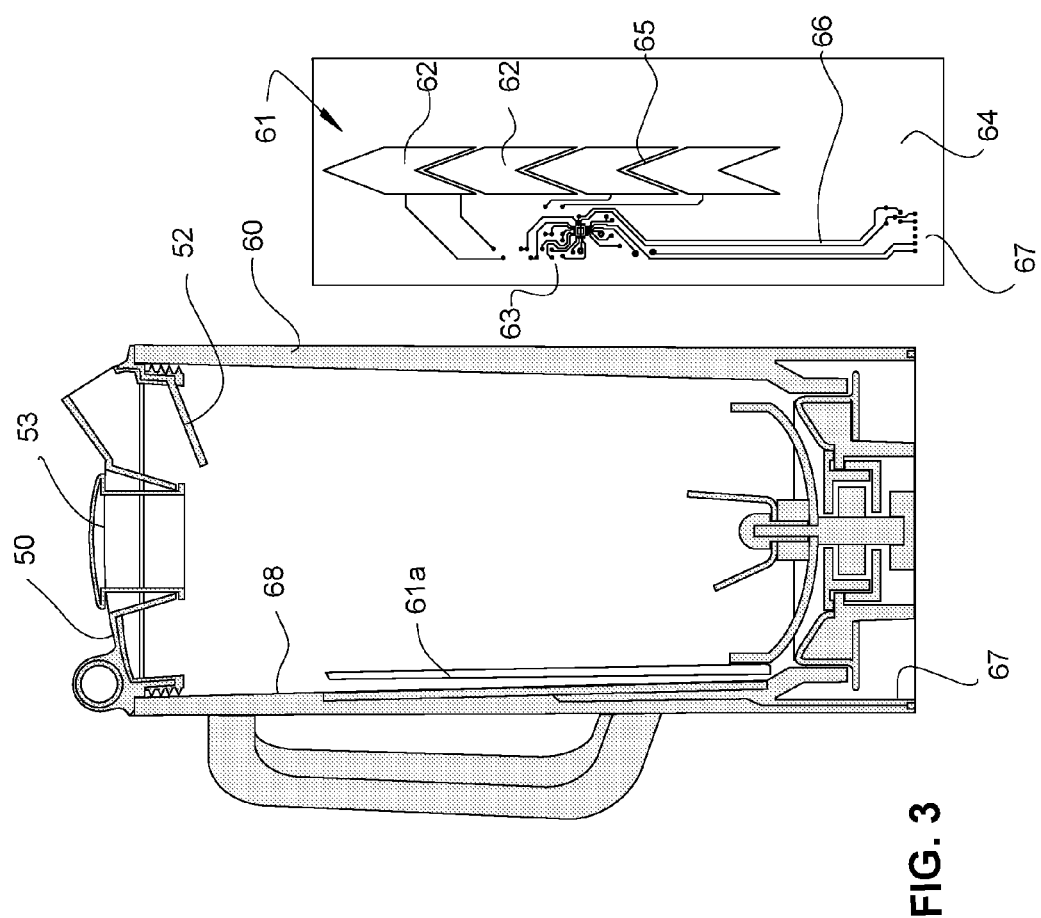
FIG. 3 is a cross sectional view of a blender jug and a plan view of a fluid level sensor.

As shown in FIG. 3, a blender jug 60 can incorporate a device for measuring liquid height within or on an exterior surface of the jug and thereby, liquid volume. In this example, the liquid volume measuring device 61 comprises an array of parallel strips 61a or vertically aligned chevrons or V-shaped conductive elements 62 forming a capacitive sensor. In some embodiments, the associated capacitive circuitry 63 is located on the sensor printed circuit 64. The capacitive sensor may use either discreet electronics, a capacitive integrated circuit controller or be driven by a dedicated microprocessor control unit (MCU). In this example, narrow "V" shaped gaps 65 are provided between adjacent conductive elements 62. The fluid level is determined by detecting or determining signal strength from, or when a particular conductive or capacitive element 62 switches between "off" (above the fluid level) to "on" (below the fluid level). Conductive traces 66 extend between the sensor's circuitry 63 or its elements 62 and an externally accessible electronic communication interface 67. The traces may be copper or indium tin oxide (ITO), or another conductive material. The communications interface 67 provides signals to the device's MCU, the interface being a serial digital link, variable voltage level or pulse with modulated signal. The printed circuit element, preferably a flexible element 64 may be adhered to, affixed, over moulded or laminated to the interior surface 68 of the jug 60. The sensor is preferably flush mounted with respect to the interior 68. In preferred embodiment, the level sensor provides a detection accuracy of approximately 1 mm. Thus, the number of elements 62 may depend on the volume or fill capacity and dimensions of the jug 60. Level sensing devices 61 may require calibration or tuning and the associated circuitry may need to account for changes to the environment such as changes in humidity or temperature. The sensor device 61 will be isolated from the liquid contents of the jug and the calibration may have to account for the thickness of the layer that isolates the elements 62 from the liquid contents of the jug 60. Liquid level information derived from the sensor 61 can be used to control the operation of the adjacent juicer and can be used to facilitate the preparation of multi-component beverage recipes by displaying actual volumes or particular instructions to the user via a graphic interface.

As shown in FIG. 4, the feed tube 70 and pusher 71 may cooperate to cause the activation and deactivation of the electric motor 13. A sensor 72 near the upper rim 73 of the feed tube 70 detects when the pusher is inserted. The sensor 72 provides a signal to the micro processor or controller 79a through traces 73 that are carried in or within the walls of the feed tube 70. The sensor may be a magnetic sensor, hall sensor, capacitive sensor or the like. The sensor 72 responds to an appropriate trigger 74 embedded in or applied to an exterior surface or otherwise carried by the pusher 71. In this way, the motor cannot be operated unless the pusher 71 has been inserted into the feed tube. Because the feed tube has a slot 75 for accommodating the feed tube's knife 20, the pusher and feed tube will also have mechanical features that cooperate or interleave to prevent the pusher from being inserted into the feed tube except in the proper orientation. A second sensor 76 is located at the bottom of the feed tube 70 and is also adapted to sense the trigger or transducer 74 in the pusher 71. The second sensor also has associated traces 77 that are carried in or on the feed tube. The various traces 73, 76 may travel within or on the surface of lid 78 and thereby be collected at an electrical coupling 79 located, for example, on a portion of an edge of the lid 78.

Figure 5:
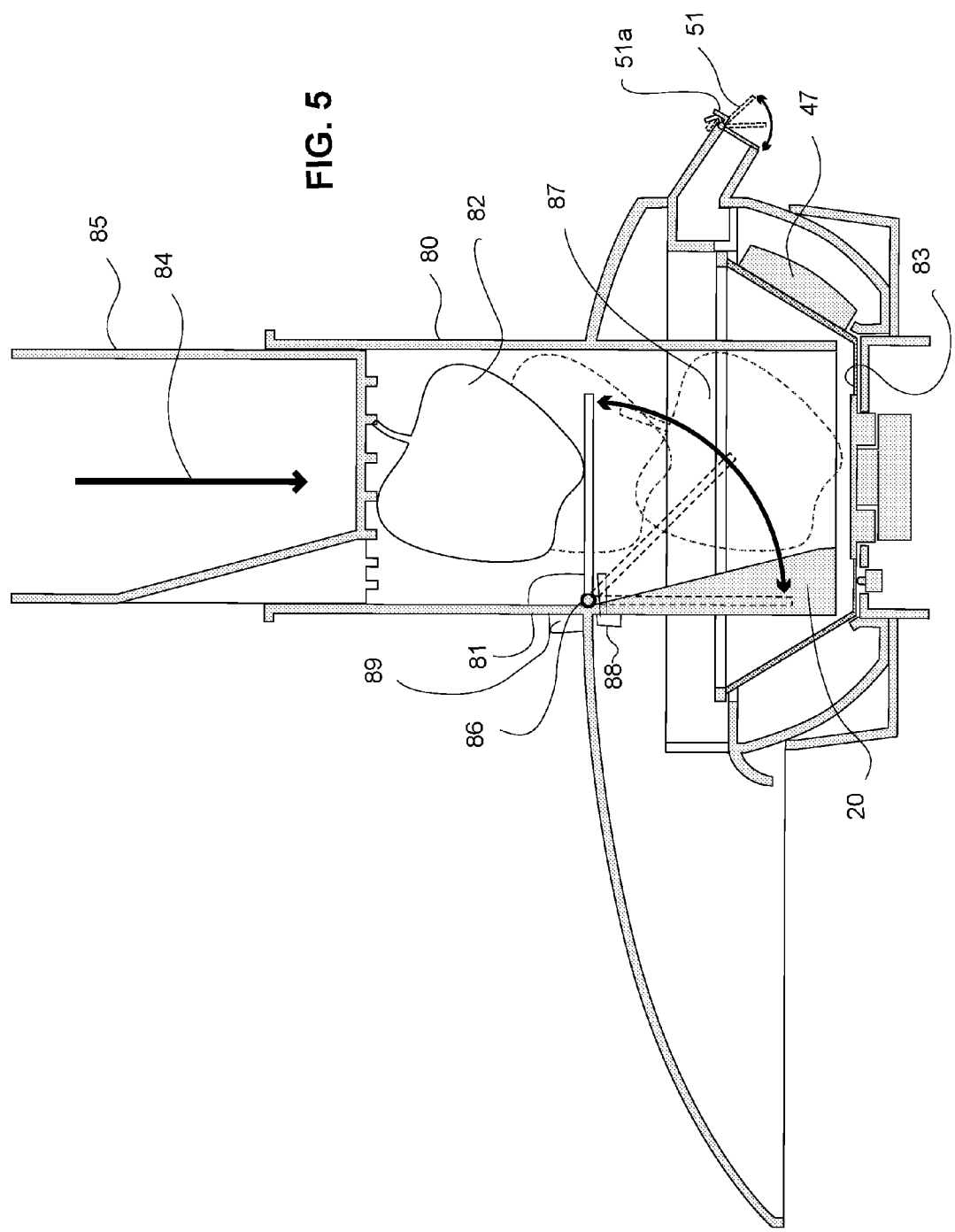
FIG. 5 is a cross sectional view of a feed tube having an internal gate.

In selected embodiments of the invention, stalling of overloading the electric motor 13 is avoided by providing the feed tube with an internal gate. As shown in FIG. 5, a large piece of fruit or a whole fruit such as an apple has the capacity to interfere with the starting of the electric motor 13 if it were at the bottom of the feed tube and resting against the grating disc when the motor was started. In order to avoid this situation, the interior of the feed tube 80 is provided with a mechanical gate 81. The gate spans the interior of the feed tube and forms a horizontal platform that prevents fruits or vegetables 82 from descending to the bottom of the feed tube and thus making contact with the grating disc 83. When adequate mechanical pressure 84 is applied to the pusher 85 the resilient bias or spring force that supports the gate 81 is overcome. This allows the gate 81 to pivot on its hinge 86. This clears the path within the feed tube for the fruit 82 to descend to its lower most position 87. The motor may be activated prior to or when the gate 81 begins its pivoting descent. The motor will reach operational speed and torque before the fruit reaches the grating disc 83. The gate 81 may be released electromechanically, for example, with a solenoid 88. The movement of the gate away from its rest or horizontal position may be detected with a sensor or micro switch 89, thus providing an electronic signal that can be used by the MCU to start the electric motor 13.

Because a user may wish to fill only a single glass with juice discharged from the spout 43 and because the height of the spout above the base is greater than the height of a typical glass, FIG. 6 illustrates how an elevated filling platform 90 may be provided. In some embodiments, an elevated platform for a single or small serving, glass or cup comprises a flat panel 91 that is carried by a hinge 92 on an external surface 93 of the juicer housing. The platform 90 is located below the spout 43. The platform 91 may be spring biased to return 94 to an upright and flush orientation with respect to the housing 93. In the alternative, the platform 90 can fold down 96, for example, into a recess 97 formed on the exterior of the juicer's housing.

A micro switch 95, when contacted by a portion of the platform that is internal to the housing may be used to override the blender jug interlock micro switch 102. The blender jug interlock 102 will normally prevent the motor from supplying power to the blender unless the jug is correctly positioned on the base. However, the jug is not required if a glass or other container is present on the deployed platform 90.

In some embodiments, the platform may be adjusted in its vertical height above the base 11. Height adjustment may be achieved with an array of horizontal slots 98 into which the platform may be introduced for horizontal support. In some embodiments, the platform 90 features a central opening 99 which is sized to accommodate the driving coupling 100 and other parts that may surround it 101. This allows the platform 90 to be lowered into the base 11 in a way that it will not interfere with the blending jug when it is located on its coupling 100.

As shown in FIG. 7, a citrus juicing or press accessory 110 may be located onto the juicer housing when the juicing accessory set is not present. In this example, the citrus press accessory comprises a reamer 111 that is somewhat inclined from the longitudinal axis of the electric motor 13 and its upper, vertical output shaft 1411. The reamer 111 is provided with a circumferential and integral filter ring 112 that allows juice to pass through it. The juice that passes through the filter ring 112 is collected in an integral and circumferential collection trough 113 located at the bottom of the reamer. Because the reamer is inclined, the collected juice will flow down hill toward a discharge spout 114 where upon it can be collected by the jug 115 or other container. A lower portion of the citrus press comprises a housing 116 within which is a coupling 117 that is adapted to transmit rotational power from the press' primary power coupling 118 to the reamer 111 and also accommodate the misalignment between the primary coupling 118 and the inclined reamer 111. In preferred embodiments, the lower housing 116 has a lower edge that is adapted to make contact with the micro switch 32 that communicates with the MCU. In this way, adequate pressure on the reamer during juice extraction from a piece of citrus fruit will cause the micro switch 32 to trip. In this way, power is supplied to the motor 13 by the MCU only when a user applies pressure to the fruit being juiced by the reamer 111.

As shown in FIG. 8, a removable blender jug 120 may be provided with a removable floor insert 121. Similar blender jugs are known to have a removable insert that allows the floor of the jug, the blade assembly and its coupling to be removed as a single unit. In this example, the removable floor assembly 121 comprises a continuous bowl shaped floor 122 that is sealed against the adjacent side wall 123 of the jug so that leakage is prevented. The assembly 121 is removable and can be replaced by a similarly shaped insert having a blade assembly and coupling. The jug 120 may be provided with a fluid level measurement device 124 of the type discussed and illustrated with reference to the example of FIG. 3. In other respects, the jug interacts with the base in accordance with the previous teachings and has dimensions, measurements and an inlet 125 commensurate with the aforementioned teachings and examples, with specific reference to FIG. 1.

As shown in FIG. 9, a jug 130, otherwise similar to the jugs shown in FIGS. 1, 3 and 8 has an integral, continuous bowl shaped floor 131 that lacks a blade assembly or an opening for a blade assembly. Thus, the jugs of FIGS. 8 and 9 can be used for the collection of juices that are output from the fruit and vegetable juicer or citrus press previously disclosed. The jug may be provided with a fluid level measurement device 124.

As shown in FIG. 10, a juicer 140 has a juice collector 141 within which is the frusto-conical filtering sieve and pulp ejector 142. The filter or sieve 142 is affixed to a coupling 143. The coupling has a cylindrical outer wall 144 that supports a circumferential array of fins 145. The fins create an upward air flow 146 that assists in driving juice upwardly and toward a spout 147 that passes through the wall of the juice collector 141. In this example, the spout 147 is cylindrical and angled slightly downward from the horizontal. The spout is long enough to enter the adjacent jug 148. The spout preferably enters the jug 148 through an opening in a side wall 149 of the jug 148. The interconnection between the spout and the jug 148 may be optionally improved by providing the lid 15 of the jug with a backing panel 151. The backing panel 151 may be affixed to or co-moulded with the lid 150. The interconnection between the backing panel 151 and the lid 150 may be improved and rigidised with a descending rib 152 that extends partially into the backing panel 151. In preferred embodiments, the backing panel 151 is a softer polymer and the lid 150 and integral rib 152 are formed from a harder or more rigid polymer. The backing panel 151 features an opening 152 that registers with the opening 153 in the side wall of the jug when the lid is in place on the jug. The opening 152 is angled to cooperate with the entry angle of the spout 147. The internal bore of the opening 152 may be smooth or may have one or more seals such as lip seals 154. In this embodiment, the spout is provided with a terminal baffle 155. In this example, the baffle fits over a step or terminal necking 156 formed in that part of the spout that is integral with the juice collector 141. In this example, the end face 157 of the baffle 155 is angled downwardly with respect to the vertical and provided with one or more through openings 158. In some embodiments, the spout is located vertically above a reinforcing rib 159 that is integral with a side wall of the jug. The backing panel 151 may also have a lip 160 around the opening 152 that cooperates with and improves the seal between the panel and the side wall of the jug.

As shown in FIG. 11, the baffle 170 may optionally be formed integrally with the backing panel 171. In this example, the juice exit 172 of the baffle comprises an end wall 173 in which is formed one or more openings 174. The end wall is preferably angled with respect to the vertical. Accordingly, the juicer's spout 175 terminates within a cylindrical sleeve 176 that is part of the backing panel 171. The backing panel also includes a circumferential seal 177 that locates between the spout 175 and the side wall of the jug 176 when the spout is in place. The baffle arrangements depicted in FIGS. 10 and 11 inhibit the flow of juice from the jug into the juicer when the blender is in operation.

Figure 12:
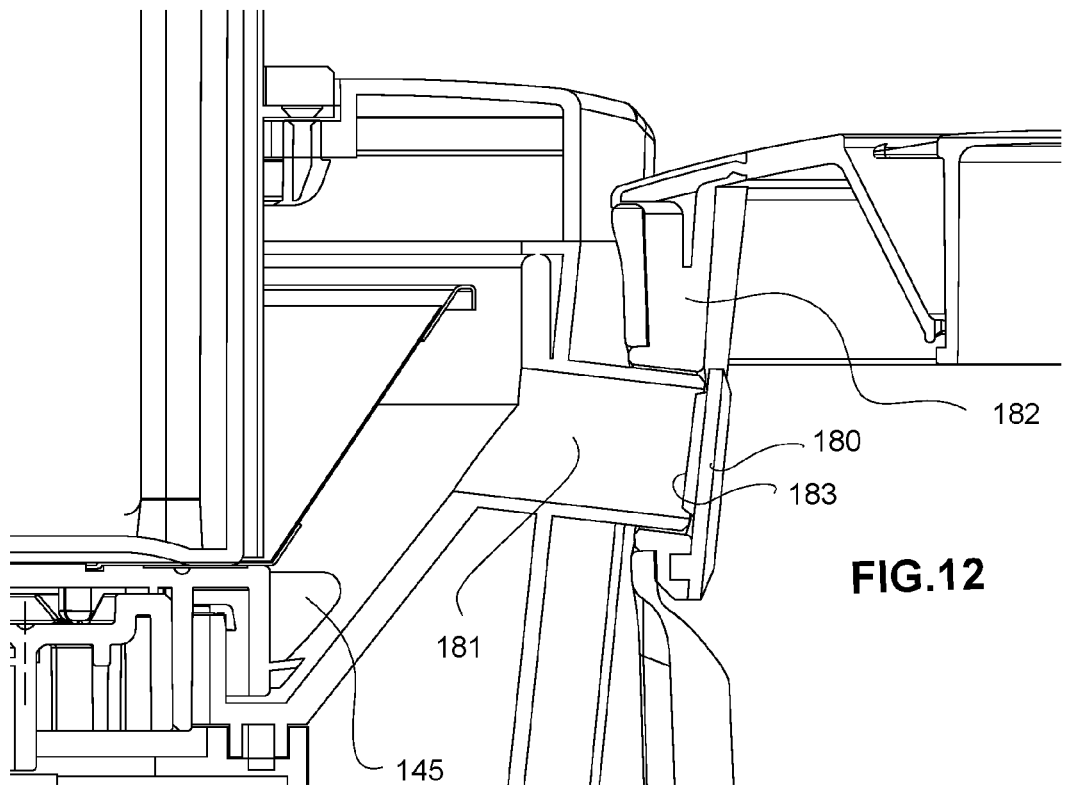
FIG. 12 is a cross section through a spout of a juicer that enters a side wall of a jug.
Figure 13:
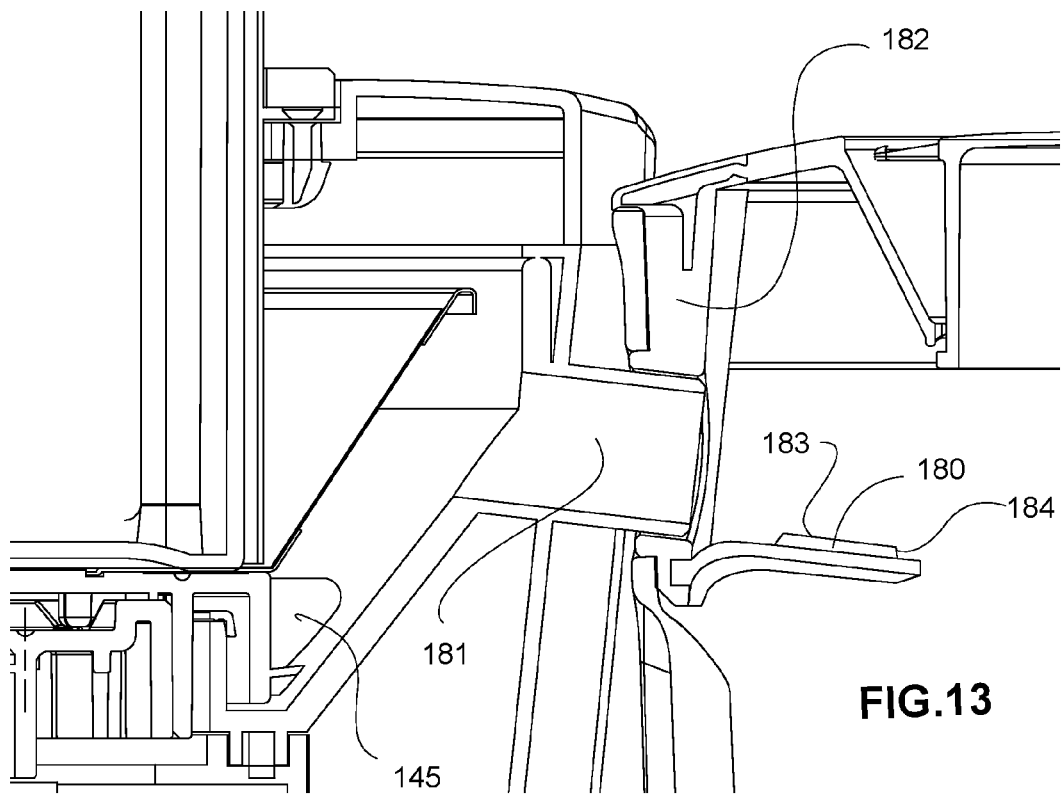
FIG. 13 is a cross section through a spout of a juicer that enters a side wall of a jug.

As shown in FIGS. 12 and 13, some embodiments of the invention utilise a flexible or hinged stopper 180. As shown in FIG. 13, the stopper 180 flexes under the influence of air and juice exiting the spout 181. In this example, the baffle 180 is a separate component that is affixed to the backing 182. The flap-like baffle 180 returns to its closed position (see FIG. 12) when the juicer is not in operation, or under the influence of liquids or solids rising vertically in the blender when it is in operation. The baffle 180 may have a plug portion 183 having tapering side walls 184 for better sealing the exit opening of the spout 181.

Figure 14:
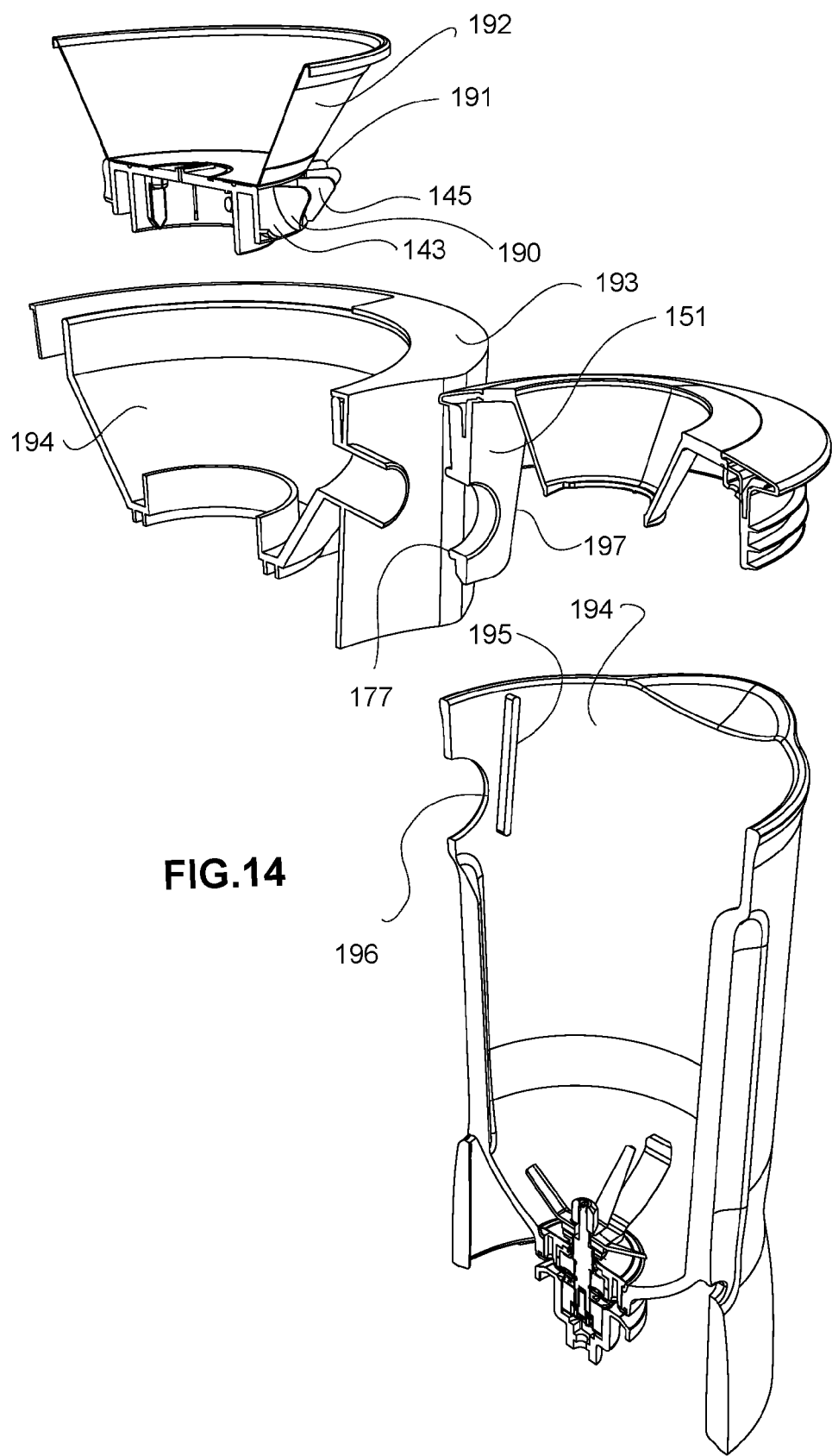
FIG. 14 is an exploded perspective, cross sectioned, of a juice collector, grating disc and filter basket, jug and lid.

As shown in FIGS. 10-15, the vanes 145 comprise radially extending projections or blades from the coupling portion 143 of the grating disc and filter assembly. In this example, the vanes are tapered from a smallest chord 190 toward the bottom or base of the coupling, to a wider chord 191 closer to the filter 192. FIG. 14 also illustrates that an uppermost surface 193 of the juicer body comprises a shelf or return located above the juice collector 194 that inhibits the flow of pulp into the juice collector.

The air flow in the juice collector, generated by the vanes, in addition to urging juice toward the spout, creates a region of positive pressure in the gap 142a between the upper rim of the frusto-conical sieve 142 and the juice collector. The zone of positive pressure inhibits the movement of pulp ejected by the sieve into the internal space of the juice collector 141. FIG. 14 also illustrates that the interior surface 194 of the jug may features guides or ribs 195 adjacent to the through opening 196 in the side wall of the jug. The guides or ribs 195 cooperate with the side edges 197 of the backing panel 151 to better locate the backing 151 and assist in the alignment of the opening in the backing 151 and the opening 196 in the side wall.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller computer or computing system, or similar electronic computing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

The invention claimed is:

1. An apparatus for juicing, the apparatus including:
a base having a motor;
a juicer device having a juice collection chamber and a frustoconical filter basket;
the filter basket is located within the juice collection chamber; wherein the filter basket has a lower grating disc and an upwardly-outwardly directed filter surface extending from the grating disc;
the juice collection chamber defines a central opening that admits a juicer coupling driven by the electric motor; the juicer coupling drives axial rotation of the filter basket; and
wherein the juice collection chamber has an upwardly-outwardly directed peripheral sidewall and an inwardly directed rim about the upper perimeter of the sidewall;
a juice discharge aperture is located proximal to the rim;
the juice discharge aperture being in the juice collection chamber and forming an inlet to a juice discharge spout.

2. An apparatus according to claim 1, wherein rotation of the filter basket imparts centripetal force on extracted juice passing through the filter surface, such that the extracted juice is directed to travel circumferentially and upwardly about the perimeter of the sidewalls to the juice discharge aperture.

3. An apparatus according to claim 1, wherein the inwardly directed rim at least partially defines the juice discharge aperture for enabling juice to escape there through.

4. An apparatus according to claim 1, wherein the inwardly directed rim has a raised shroud portion that at least partially defines the juice discharge aperture to thereby define a through passage for enabling juice to escape there through.

5. An apparatus according to claim 1, wherein the juice collection chamber is substantially bowl shaped.

6. An apparatus according to claim 1, wherein the central opening of juice collection chamber is surrounded by an upright wall partition; and wherein the lower grating disc of the filter basket is located about a top of the wall partition.

7. An apparatus according to claim 1, wherein one or more helically-directed rib protrusion are provided on the inner surface of the sidewalls.

8. An apparatus according to claim 1, wherein one or more radially directed fin elements are provided on the exterior of the filter surface.

9. An apparatus according to claim 1, wherein the juicer device has a feed tube and a pusher that cooperate to provide a signal to a controller in the device, such that the juicer will not operate unless the pusher has been inserted into the feed tube.

10. An apparatus according to claim 1, wherein the juicer device has a feed tube located above the grating disk; the feed tube having a gate that pivots to allow a food in the feed tube to make contact with grating disk.

11. An apparatus according to claim 1, wherein the juicer device further comprises a coupling portion associated with that grating disk; the coupling portion having an array of vanes for generating on airflow to create a region of positive pressure between the juice collection chamber and the filter basket.

12. An apparatus according to claim 2, wherein the juice discharge aperture is in fluid flow communication with a discharge spout.

13. An apparatus according to claim 12, the apparatus further including:
a citrus juicing accessory with a reamer that replaces the filter basket that may also be carried by the juicer device;
the reamer has with a circumferential filter ring that allows juice to pass through;
the reamer has a collection trough located at the bottom of the reamer for collecting juice that passes through the filter ring;
the reamer being inclined such that juice collected in the collection trough flow down hill to the discharge spout.

14. An apparatus according to claim 1, the apparatus further including:
a height-adjustable platform located beneath the discharge spout.

15. An apparatus according to claim 1, the apparatus further including:
a blending jug supported by the base; the blending jug having internal blades driven by the motor; the discharge spout being located to dispenses extracted juice into the blending jug.

* * * * *